US011435497B2

(12) United States Patent
Wu et al.

(10) Patent No.: US 11,435,497 B2
(45) Date of Patent: Sep. 6, 2022

(54) THREE DIMENSIONAL VISUALIZATION FROM POINT-BY-POINT ONE DIMENSIONAL INVERSION WITH BED AZIMUTH

(71) Applicant: HALLIBURTON ENERGY SERVICES, INC., Houston, TX (US)

(72) Inventors: Hsu-Hsiang Wu, Sugar Land, TX (US); Michael S. Bittar, Houston, TX (US); Weixin Dong, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 388 days.

(21) Appl. No.: 16/570,800

(22) Filed: Sep. 13, 2019

(65) Prior Publication Data

US 2020/0096665 A1    Mar. 26, 2020

Related U.S. Application Data

(60) Provisional application No. 62/735,056, filed on Sep. 22, 2018.

(51) Int. Cl.
*E21B 44/00* (2006.01)
*G01V 3/38* (2006.01)
(Continued)

(52) U.S. Cl.
CPC .................. *G01V 3/38* (2013.01); *E21B 7/04* (2013.01); *E21B 41/0092* (2013.01);
(Continued)

(58) Field of Classification Search
CPC ... G01V 3/38; G01V 3/20; G01V 3/28; G01V 3/26; G01V 3/12; E21B 7/04;
(Continued)

(56) References Cited

U.S. PATENT DOCUMENTS 6,804,625 B1    10/2004  Bryant
7,366,616 B2    4/2008   Bennett et al.
(Continued)

FOREIGN PATENT DOCUMENTS

CN      1632617 A  *  6/2005  ............... G01V 3/12
CN    104730585 A  *  6/2015  ............. Y02A 90/30
(Continued)

OTHER PUBLICATIONS

International Search Report, PCT Application No. PCT/US2019/051169, dated Jan. 6, 2020.
(Continued)

*Primary Examiner* — Kandasamy Thangavelu
(74) *Attorney, Agent, or Firm* — Novak Druce Carroll LLP

(57) ABSTRACT

Data filtering and processing techniques for generating improved wellbore resistivity maps are contemplated. In some aspects, a process of the disclosed technology includes steps for receiving a plurality of measurement sets, wherein each measurement set comprises electromagnetic field data associated with a geologic formation at a corresponding plurality of predetermined depths, generating a plurality of one-dimensional (1D) inversion results based on the plurality of measurement sets, and performing a three-dimensional (3D) interpolation on the plurality of 1D inversion results to generate interpolated 3D resistivity data. In some aspects, the disclosed technology further includes steps for outputting a 3D resistivity map based on the interpolated 3D resistivity data. Systems and machine-readable media are also provided.

20 Claims, 9 Drawing Sheets

(51) Int. Cl.
  *G01V 3/20* (2006.01)
  *E21B 7/04* (2006.01)
  *E21B 49/00* (2006.01)
  *E21B 41/00* (2006.01)

(52) U.S. Cl.
  CPC .............. *E21B 44/00* (2013.01); *E21B 49/00* (2013.01); *G01V 3/20* (2013.01)

(58) Field of Classification Search
  CPC ...... E21B 41/0092; E21B 44/00; E21B 49/00; G06T 17/05; Y02A 90/30
  See application file for complete search history.

(56) References Cited

U.S. PATENT DOCUMENTS

| | | |
|---|---|---|
| 2009/0083006 A1 | 3/2009 | Mackie |
| 2010/0117655 A1 | 5/2010 | Bittar |
| 2010/0332198 A1* | 12/2010 | Wahrmund .............. G01V 3/12 703/2 |

FOREIGN PATENT DOCUMENTS

| | | | | |
|---|---|---|---|---|
| CN | 104854479 A | | 8/2015 | |
| CN | 107075938 A | * | 8/2017 | .............. E21B 7/04 |
| CN | 108291438 A | * | 7/2018 | .............. G01V 3/28 |
| WO | 0120366 A1 | | 3/2001 | |
| WO | WO 2016111678 A1 | * | 7/2016 | ............. E21B 44/00 |

OTHER PUBLICATIONS

English abstract of CN104854479; retreived from www.espacenet.com on Sep. 13, 2019.

\* cited by examiner

THREE DIMENSIONAL VISUALIZATION FROM POINT-BY-POINT ONE DIMENSIONAL INVERSION WITH BED AZIMUTH

CROSS-REFERENCE TO RELATED APPLICATIONS

This application claims the benefit of U.S. Application No. 62/735,056, filed Sep. 22, 2018, entitled "THREE DIMENSIONAL VISUALIZATION FROM POINT-BY-POINT ONE DIMENSIONAL INVERSION WITH BED AZIMUTH", which is incorporated by reference in its entirety.

BACKGROUND

1. Technical Field

The present disclosure pertains to formation evaluation and in particular, to methods for generating three-dimensional (3D) inversion visualizations using one-dimensional (1D) inversion slices and bed azimuth data.

2. Introduction

In drilling wells for oil and gas exploration, understanding the structure and properties of the associated geological formation provides information beneficial to such exploration. The collection of information relating to formation properties and conditions downhole is commonly referred to as "logging," and can be performed during the drilling process.

Various measurement tools exist for use in wireline logging and logging while drilling (LWD). One such tool is an electromagnetic (EM) resistivity tool. A typical resistivity tool includes one or more antennas for transmitting electromagnetic signals into the formation and one or more antennas for receiving a formation response. When operated at low frequencies, the resistivity tool may be called an "induction" tool, and at a high-frequencies may be called an electromagnetic wave propagation tool. Though the physical phenomena that dominate the measurement can vary with frequency, the operating principles for the tool are consistent. In some cases, the amplitude and/or phase of the received signals are compared to the amplitude and/or phase of the transmitted signals to measure formation resistivity. In other cases, the amplitude and/or phase of the received signals are compared to each other to measure the formation resistivity.

When plotted as a function of depth or tool position in the borehole, the resistivity tool measurements are termed "logs" or "resistivity logs." Such logs can provide indications of hydrocarbon concentrations and other information useful to drillers and completion engineers. In particular, azimuthally-sensitive logs can provide information useful for steering the drilling assembly e.g., to facilitate geosteering.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Reservoir resistivity maps are frequently used by drillers and completion engineers to facilitate geosteering and enhance production. However, in conventional resistivity maps the logged resistivity data is used to produce one-dimensional (1D) or two-dimensional (2D) visualizations, which are not optimal for informing difficult geosteering decisions. As such, much expertise is required to make accurate geosteering decisions from the limited information provided by conventional wellbore visualizations.

Aspects of the disclosed technology address the foregoing limitations of conventional wellbore visualizations by providing 3D wellbore maps. As discussed in further detail below, 3D visualizations can be generated by interpolating 1D inversion results using relative bed azimuth angle data. In some aspects, the resulting 3D visualizations can be used to successfully steer a well, in three-dimensions, using the 3D visualization output result.

Figure 1:
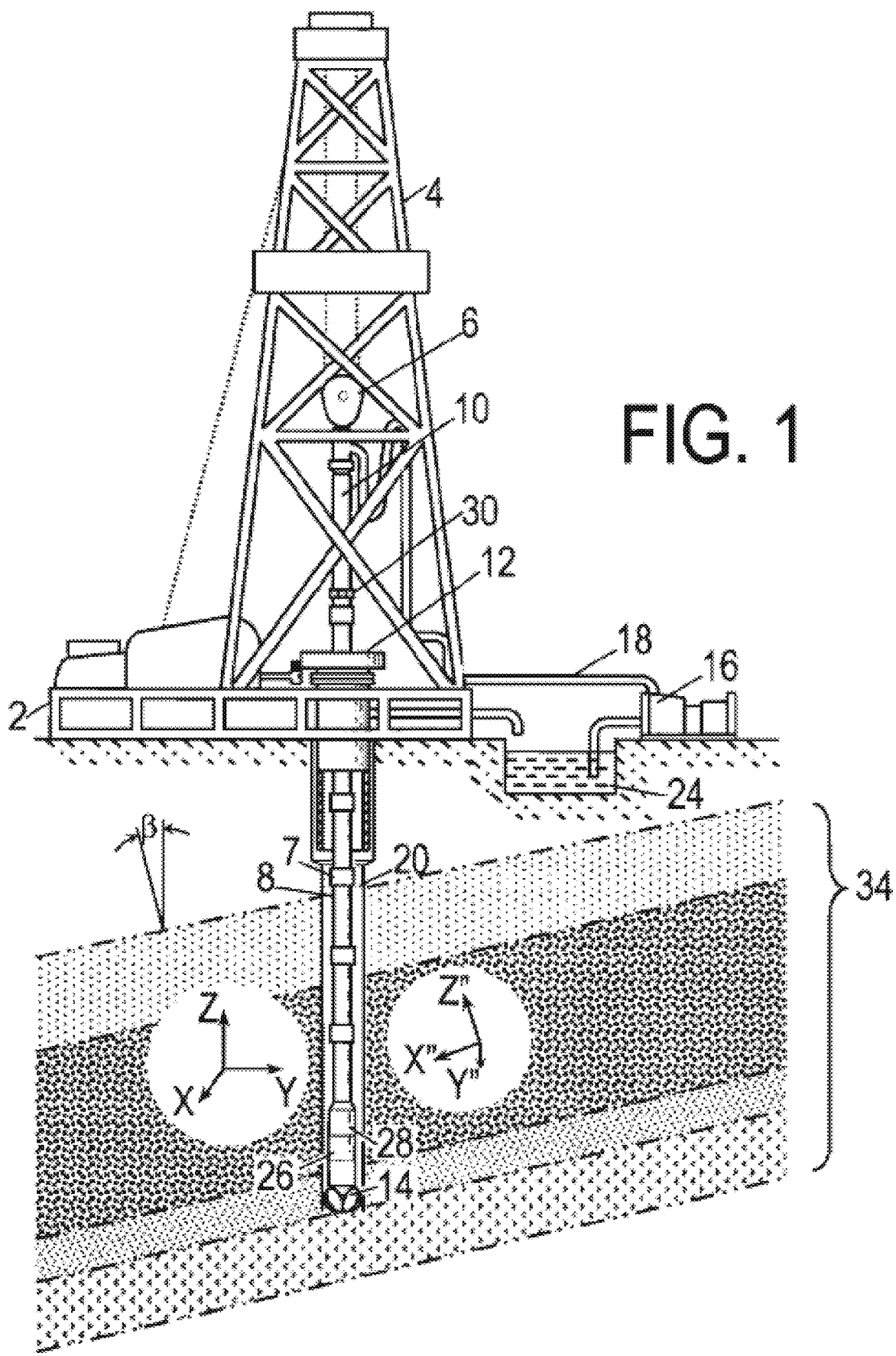
FIG. 1 is a schematic diagram of an example logging-while-drilling (LWD) environment.

To illustrate a context for the disclosed systems and methods, FIG. 1 shows a well during drilling operations. A drilling platform 2 is equipped with a derrick 4 that supports a hoist 6. Drilling oil and gas wells is carried out by a string of drill pipes connected together by "tool" joints 7 so as to form a drill string 8. Hoist 6 suspends a kelly 10 that lowers the drill string 8. Hoist 6 suspends a kelly 10 that lowers the drill string 8 through rotary table 12. Connected to the lower end of the drill string 8 is a drill bit 14. Bit 14 is rotated and drilling accomplished by rotating the drill string 8 by use of a downhole motor near the drill bit, or by both methods.

Drilling fluid, termed "mud," is pumped by mud recirculation equipment 16 through supply pipe 18, through drilling kelly 10, down through the drill string 8 at high pressures and volumes to emerge through nozzles or jets in drill bit 14. The mud then travels back up the hole via the annulus formed between the exterior of drill string 8 and borehole wall 20, through a blowout preventer, and into a mud pit 24 on the surface. On the surface, the drilling mud is cleaned and then recirculated by recirculation equipment 16.

For logging while drilling (LWD), downhole sensors 26 are located in the drillstring 8 near the drill bit 14. Sensors 26 include directional instrumentation and a modular resistivity tool with tilted antennas for detecting bed boundaries. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the wellbore.

In some embodiments, directional measurements are made as follows: a three-axis accelerometer measures the earth's gravitational field vector relative to the tool axis and a point on the circumference of the tool called the "tool face scribe line." (The tool face scribe line is drawn on the tool surface is a line parallel to the tool axis.) From this measurement, the inclination and tool face angle of the LWD tool can be determined. Additionally, a three-axis magnetometer measures the earth's magnetic field vector in a similar manner. From the combined magnetometer and accelerometer data, the horizontal angle of the LWD tool can be determined. In addition, a gyroscope or other form of inertial sensor can be incorporated to perform position measurements and further refined orientation measurements.

In some embodiments, downhole sensors 26 are coupled to a telemetry transmitter 28 that transmits telemetry signals by modulating the mud flow in drillstring 8. A telemetry receiver 30 is coupled to kelly 10 to receive transmitted telemetry signals. Other telemetry transmission techniques are well-known and may be used. The receiver 30 communicates the telemetry to a surface insulation (not shown) that processes and stores the measurements.

As illustrated in FIG. 1, drill bit 14 is shown penetrating a formation having a series of layered beds 34 dipping at an angle. A first (x, y, z) coordinate system associated with the sensors 26 is shown, and a second coordinate system (x", y", z") associated with the beds 32 is shown. The bed coordinate system has the z" axis perpendicular to the bedding plane, has the y" axis in a horizontal plane, and has the x" axis pointing "downhill." The angle between the z-axis of the two coordinate systems is referred to as the "dip" and is shown in FIG. 1 as the angle (3.

Figure 2:
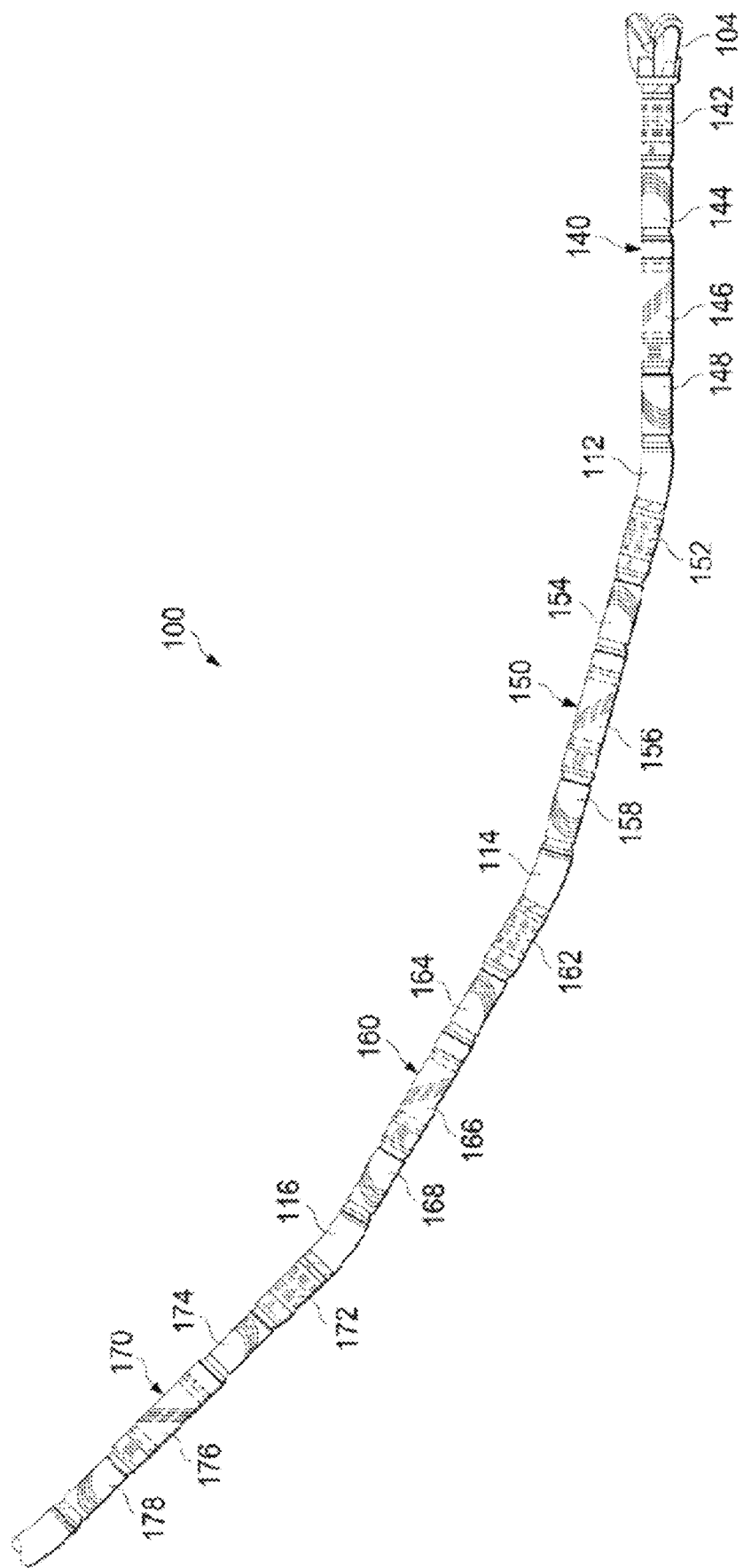
FIG. 2 shows an illustrative resistivity logging tool that can be implemented in accordance with some inventive aspects.

Referring now to FIG. 2, which depicts an example of a multi-sub resistivity tool 100. In the illustrated example, tool 100 comprises a set of four subs distributed along a curved borehole trajectory. The four subs include a first sub 140, a second sub 150, a third sub 160, and a fourth sub 170. A longitudinal axis of the first sub 140 is approximately horizontal with respect to the x-y plane. A drill bit 104 attaches to the lower end (relative to the bottom of the wellbore) to the first sub 140. A first coaxial coil antenna 142 wraps around the body of the first sub 140 near the lower end. The first sub 140 also includes a first tilted coil antenna 144 positioned adjacent to the first coaxial coil antenna 142.

The first sub 140 includes a second tilted coil antenna 146 positioned adjacent to the first tilted coil antenna 144. The first sub 140 also includes a third tilted coil antenna 148 adjacent to the second tilted coil antenna 146. In some embodiments, each of the coil antennas 142-148 is operated as transmitter antenna. In other examples, each of the coil antennas 142-148 can be operated as either receiver or transmitter antenna.

A connecting tubular 112 attaches to the upper end (relative to the top of the wellbore) of the first sub 140. A second sub 150 attaches to the upper end of the connecting tubular 112. The second sub 150 is rotatable with respect to its longitudinal axis, and the longitudinal axis can be at an angle with respect to the longitudinal axis of the first sub 140. A first coaxial coil antenna 152 wraps around the lower-most side of the second sub 150. The second sub 150 also includes a first tilted coil antenna 154 positioned above and adjacent to the first coaxial coil antenna 152. The second sub 150 includes a second tilted coil antenna 156 positioned adjacent to the first tilted coil antenna 154. The second sub 150 also includes a third tilted coil antenna 158 adjacent to the second tilted coil antenna 156. In one example, each of the coil antennas 152-158 is operated as receiver antenna. In other examples, each of the coil antennas 152-158 can be operated as either receiver or transmitter antenna.

A connecting tubular 114 attaches to the upper end (relative to the top of the wellbore) of the second sub 150. A third sub 160 attaches to the upper end of the connecting tubular 114. The third sub 160 is rotatable with respect to its longitudinal axis, and the longitudinal axis can be at an angle with respect to the longitudinal axis of the second sub 150. A first coaxial coil antenna 162 wraps around the lower-most side of the third sub 160. The third sub 160 also includes a first tilted coil antenna 164 positioned above and adjacent to the first coaxial coil antenna 162. The third sub 160 includes a second tilted coil antenna 166 positioned adjacent to the first tilted coil antenna 164. The third sub 160 also includes a third tilted coil antenna 168 adjacent to the second tilted coil antenna 166. In one example, each of the coil antennas 162-168 is operated as receiver antenna. In other examples, each of the coil antennas 162-168 can be operated as either receiver or transmitter antenna.

A connecting tubular 116 attaches to the upper end (relative to the top of the wellbore) of the third sub 160. A fourth sub 170 attaches to the upper end of the connecting tubular 114. The fourth sub 170 is rotatable with respect to its longitudinal axis, and the longitudinal axis can be at an angle with respect to the longitudinal axis of the third sub 170. A first coaxial coil antenna 172 wraps around the lower-most side of the fourth sub 170. The fourth sub 170 also includes a first tilted coil antenna 174 positioned above and adjacent to the first coaxial coil antenna 172. The fourth sub 170 includes a second tilted coil antenna 176 positioned adjacent to the first tilted coil antenna 174. The fourth sub 170 also includes a third tilted coil antenna 178 adjacent to the second tilted coil antenna 176. In one example, each of the coil antennas 172-178 is operated as receiver antenna. In other examples, each of the coil antennas 172-178 can be operated as either receiver or transmitter antenna.

It is understood that the interpolation of 1D formation slices to produce 3D visualizations, as discussed in further detail below, can be performed for both wireline and logging while drilling (LWD) tools, without departing from the scope of the disclosed technology.

Additional details regarding the use of wellbore tools for performing formation resistivity measurements and boundary detection calculations are provided in U.S. Pat. No.

7,659,722, filed Aug. 8, 2007, which is incorporated by reference herein in its entirety.

Figure 3:
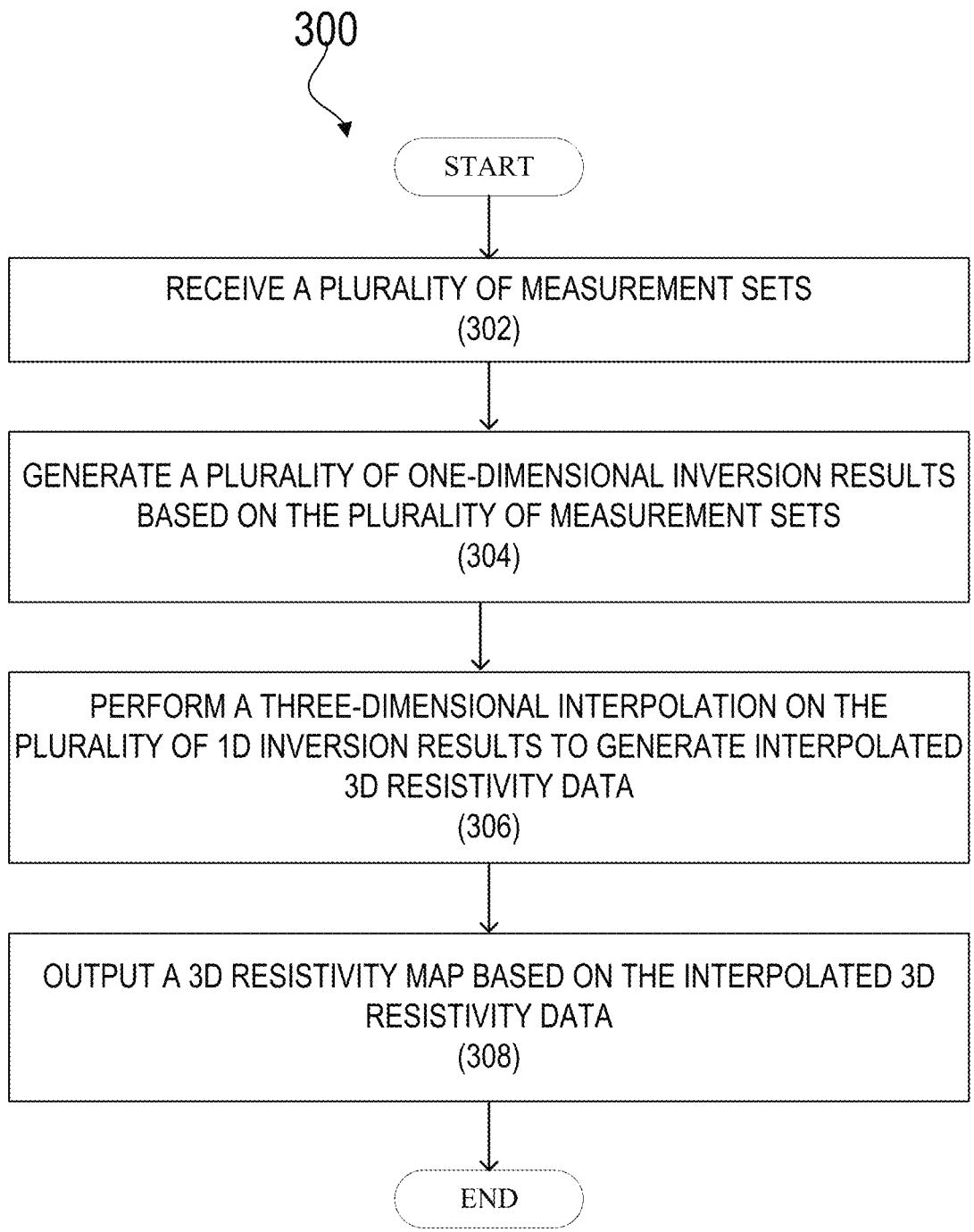
FIG. 3 is a process for generating a three-dimensional inversion map from one-dimensional (1D) inversion slices.

FIG. 3 illustrates steps of an example process 300 for generating a three-dimensional inversion map from one-dimensional (1D) inversion slices. Process 300 begins with step 302 in which a plurality of (resistivity) measurement sets are received, for example, from a tool such as tool 100, discussed above with respect to FIG. 2. In some aspects, each of the measurement sets can correspond with measurement data collected at different continuous depths/locations along a wellbore path. Each measurement set can contain data representing resistivity measurements in any direction relative to the wellbore path. In some aspects each measurement set can correspond with vertical slices of formation resistivity that are associated with a wellpath depth and/or true vertical distance (TVD) depth.

In some aspects, the measurement sets can include bed azimuth angle data that indicates a normal direction of the 1D formation planes with respect to a high-side direction of the resistivity logging tool. Depending on the implementation, bed azimuth angle data may be determined by processing performed on multi-component measurements collected by the logging tool at the various wellbore depths.

In step 304, a plurality of one-dimensional (1D) inversion results are generated based on the plurality of measurement sets received in step 302. The 1D results slices are the result of inversion processing performed on each of the measurement sets to generate a corresponding plurality of inverted formation profiles or inversion slices. Because each measurement set contains data gathered at a different logging point (e.g., a different wellbore depth), the corresponding 1D formation profiles can represent resistivity boundaries for vertical slices at each logging point. As such the 1D formation profiles can be graphically represented as multiple 1D inversion slices that occupy different locations in a coordinate plane, as discussed in further detail below with respect to FIG. 4A and FIG. 5, discussed below.

In some aspects, the 1D inversion slices can be rotated relative to their corresponding bed azimuth angles, as measured and processed in step 302. As such, the 1D inversion slices can be graphically displayed in a rotated fashion, as discussed in further detail with respect to FIG. 5, below.

In step 306, a three-dimensional (3D) interpolation is performed on the accumulated 1D inversion results to generate interpolated 3D resistivity data. In some aspects, 3D interpolation is performed using a linear interpolation method that is applied to the continuous and adjacent 1D inversion results based on a the local coordinate system for each 1D inversion slice. It is understood that various interpolation methods may be used without departing from the scope of the disclosed technology, such as linear or non-linear interpolation and extrapolation, filtering, smoothing, sharpening and so on.

In step 308, a 3D resistivity map is outputted/displayed from the (interpolated) 3D resistivity data produced in step 306. In some implementations, the resulting 3D resistivity map may be provided to a geosteering engineer, for example, to facilitate 3D geosteering within a wellbore. With the benefit of the 3D resistivity map generated from interpolated 1D inversion slices, side-to-side geosteering is facilitated, as opposed to conventional up-down steering that is based on 1D and 2D formation visualizations.

Figure 4A:
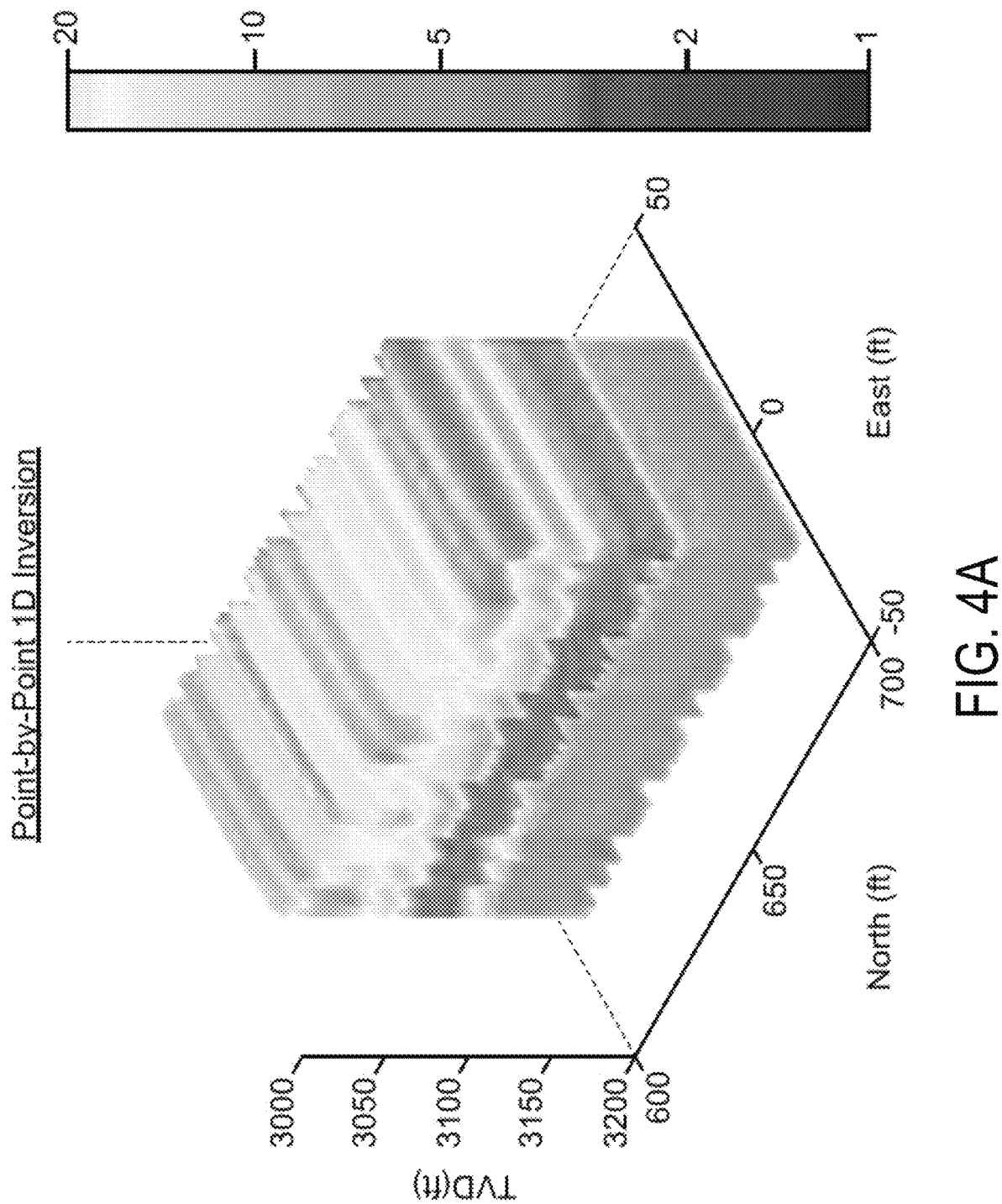
FIG. 4A illustrates point-by-point one-dimensional (1D) inversions.

FIG. 4A illustrates an example of point-by-point one-dimensional (1D) inversions displayed on North and East axes, with respect to a true-vertical distance (TVD) dimension. In the example of FIG. 4, each 1D inversion slice is displayed without angular (bed azimuth) rotation.

Figure 4B:
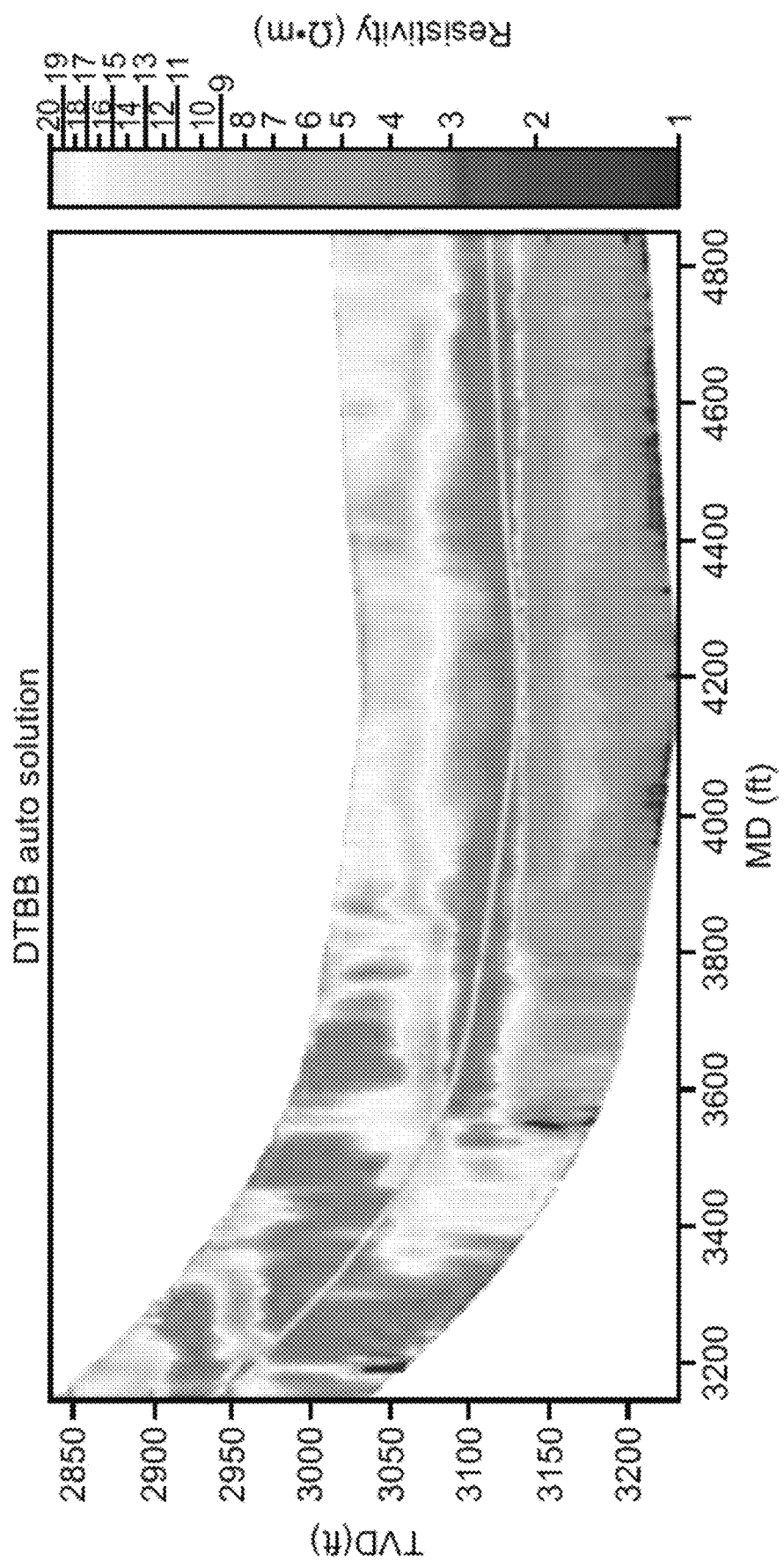
FIG. 4B illustrates an example of a two-dimensional (2D) visualization generated from 1D inversions of FIG. 4A.

FIG. 4B illustrates an example of a two-dimensional (2D) visualization generated from the 1D inversion slices depicted in FIG. 4A. That is, FIG. 4B provides an example of a continuous 2D visualization resulting from unrotated 1D inversion slices (i.e., without the benefit of bed azimuth angle information).

Figure 5:
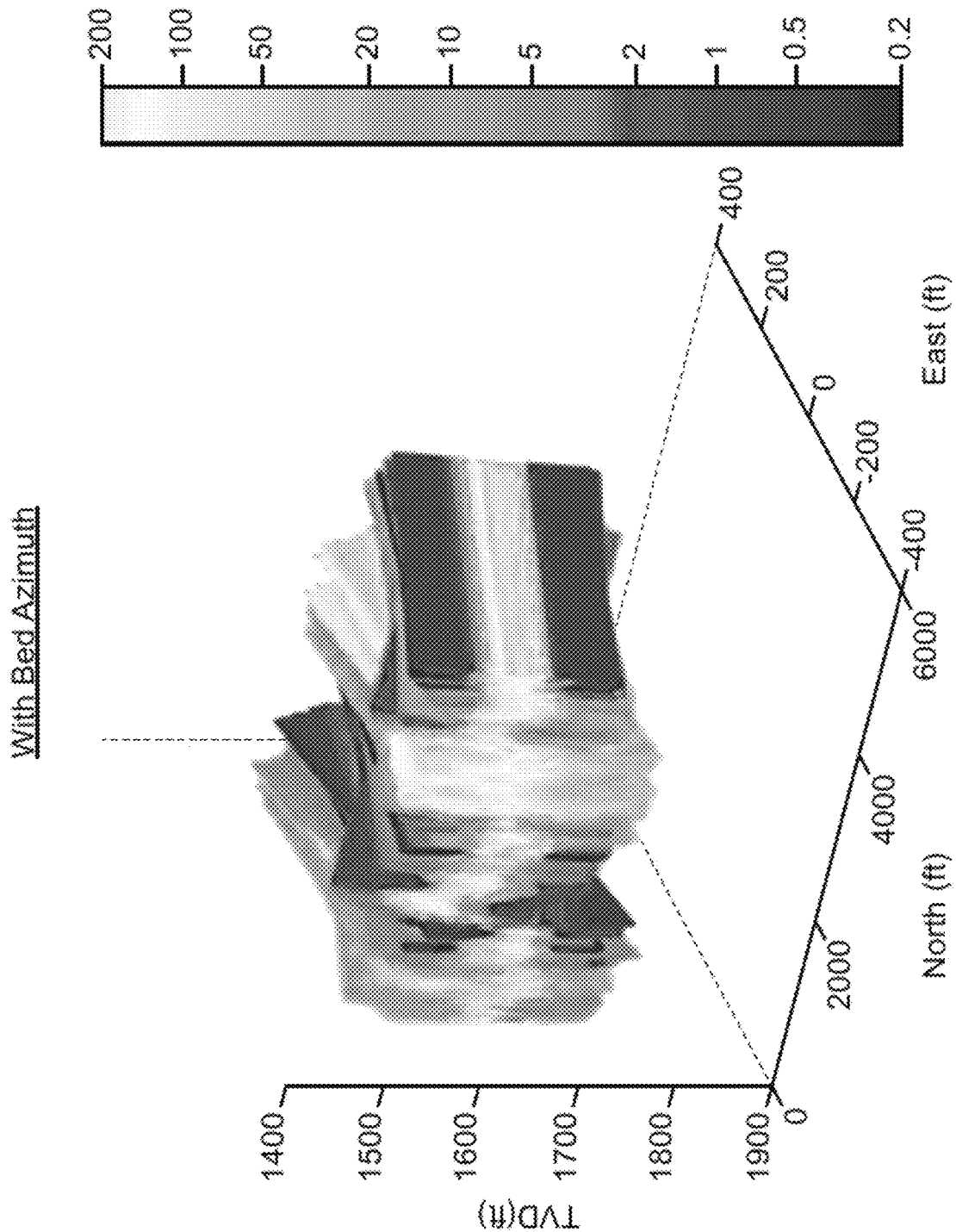
FIG. 5 illustrates an example of 1D inversion visualizations that take into account bed azimuth angle.

FIG. 5 illustrates an example of 1D inversion visualizations that take into account bed azimuth angle. In particular, the 1D inversion slices of FIG. 5 are each rotated at an angle commensurate with their corresponding bed azimuth angle.

Figure 6A:
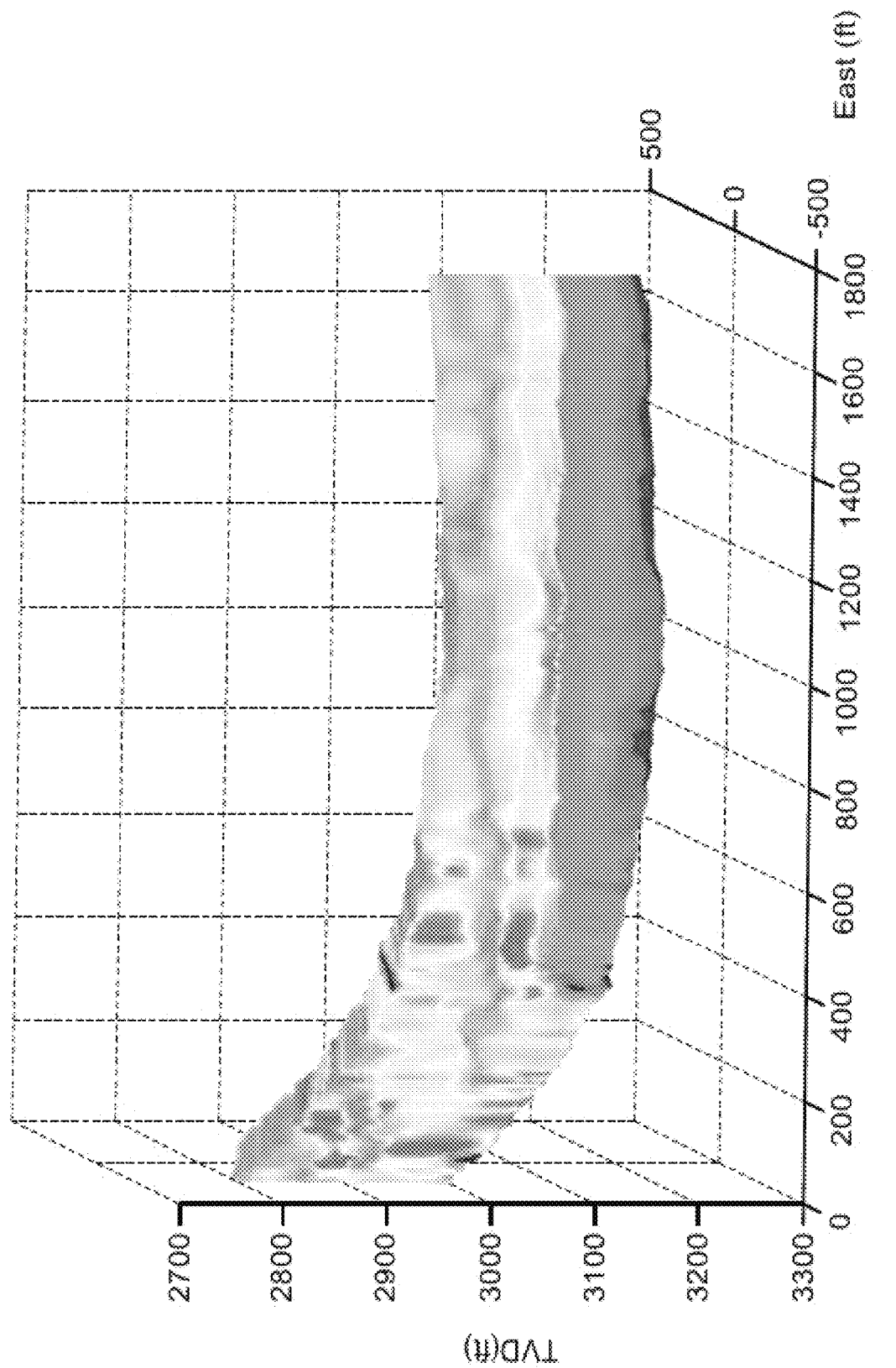
FIGS. 6A and 6B illustrate examples of a three-dimensional (3D) formation resistivity map generated by interpolating 1D inversion results with bed azimuth angle information.
Figure 6B:
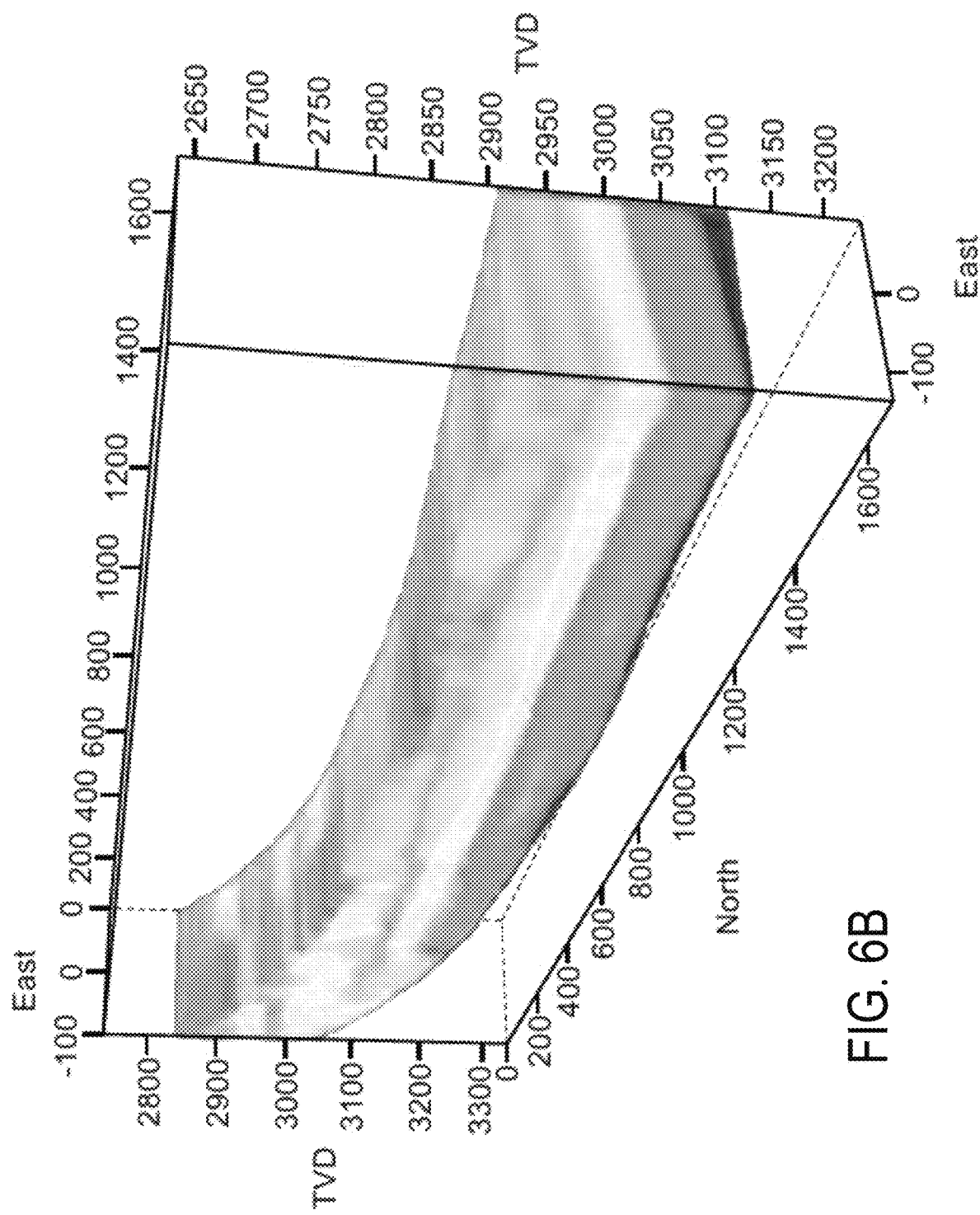

FIGS. 6A and 6B illustrate examples of three-dimensional (3D) formation resistivity maps that are generated by interpolating 1D inversion results with bed azimuth angle information, for example, as illustrated in FIG. 5. As can be seen in FIGS. 6A and 6B, formation boundaries are visible in 3D, and thereby can enable side-to-side, as well as up-down geosteering within the wellpath.

Figure 7:
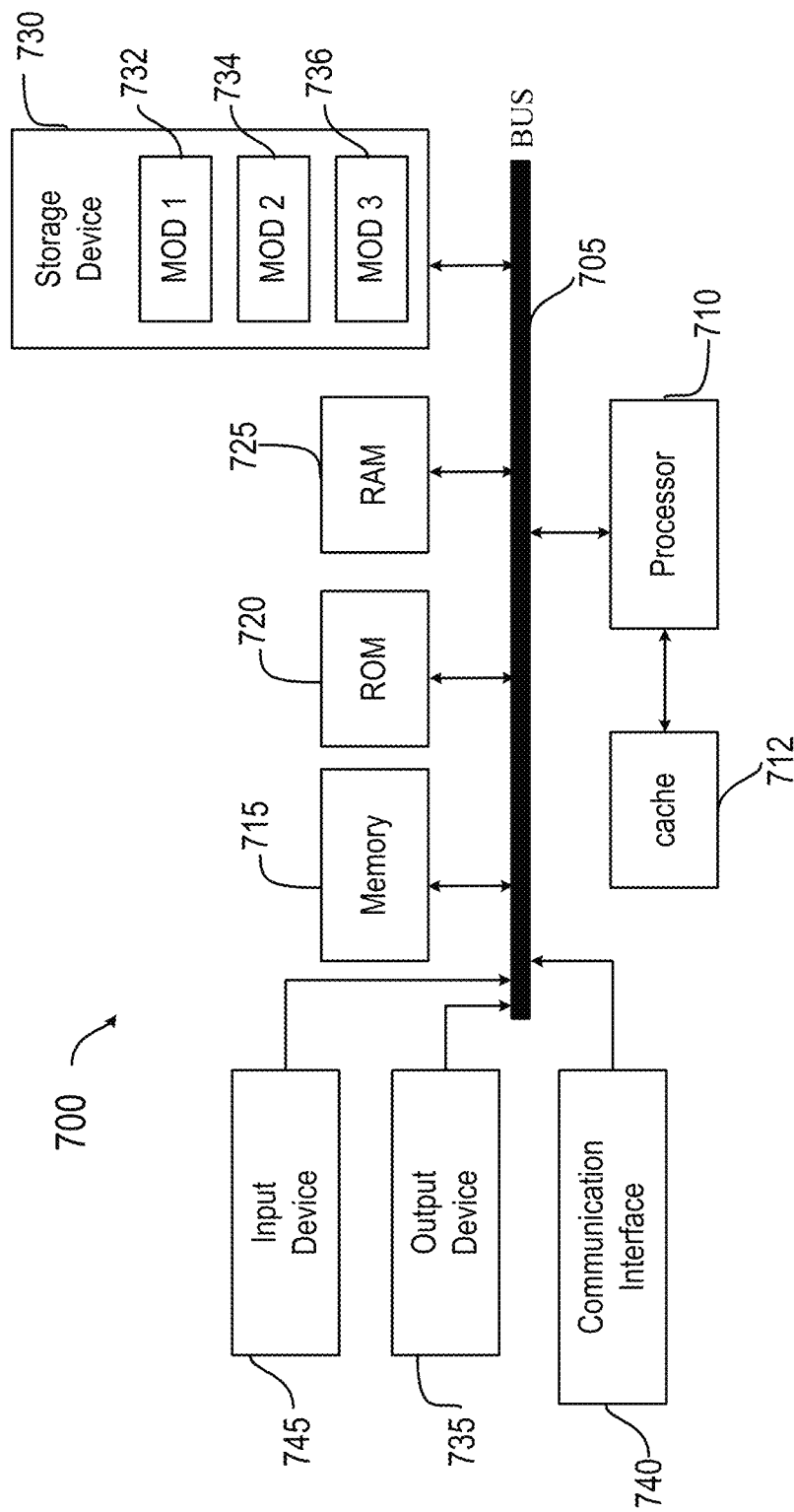
FIG. 7 is a schematic diagram of an example system embodiment.

FIG. 7 illustrates an exemplary computing system for use with example tools and systems (e.g., tool 101). The more appropriate embodiment will be apparent to those of ordinary skill in the art when practicing the present technology. Persons of ordinary skill in the art will also readily appreciate that other system embodiments are possible.

Specifically, FIG. 7 illustrates system architecture 700 wherein the components of the system are in electrical communication with each other using a bus 705. System architecture 700 can include a processing unit (CPU or processor) 710, as well as a cache 712, that are variously coupled to system bus 705. Bus 705 couples various system components including system memory 715, (e.g., read only memory (ROM) 720 and random access memory (RAM) 735), to processor 710. System architecture 700 can include a cache of high-speed memory connected directly with, in close proximity to, or integrated as part of the processor 710. System architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. Memory 715 can include multiple different types of memory with different performance characteristics. Processor 710 can include any general-purpose processor and a hardware module or software module, such as module 1 (732), module 2 (734), and module 3 (736) stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system architecture 700, input device 745 can represent any number of input mechanisms, such as a microphone for speech, a touch-sensitive screen for gesture or graphical input, keyboard, mouse, motion input, and so forth. An output device 742 can also be one or more of a number of output mechanisms. In some instances, multimodal systems can enable a user to provide multiple types of input to communicate with the computing system architecture 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 735, read only memory (ROM) 720, and hybrids thereof.

Storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 742, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

STATEMENTS OF THE DISCLOSURE

Statement 1: a computer-implemented method for generating a resistivity map, comprising: receiving a plurality of measurement sets, wherein each measurement set comprises electromagnetic field data associated with a geologic formation at a corresponding plurality of predetermined depths, generating a plurality of one-dimensional (1D) inversion results based on the plurality of measurement sets, performing a three-dimensional (3D) interpolation on the plurality of 1D inversion results to generate interpolated 3D resistivity data, and outputting a 3D resistivity map based on the interpolated 3D resistivity data.

Statement 2: the system of statement 1, further comprising: performing one or more geosteering operations based on the 3D resistivity map.

Statement 3: the method of any of statements 1-2, wherein the plurality of predetermined depths are substantially continuous.

Statement 4: the method of any of statements 1-3, wherein generating the plurality of 1D inversion results, further comprises: determining a relative bed azimuth for each of the plurality of 1D inversion results.

Statement 5: the method of any of statements 1-4, wherein generating the plurality of 1D inversion results, further comprises: defining one or more measurements for each of the plurality of 1D inversion results.

Statement 6: the method of any of statements 1-5, wherein each of the plurality of 1D inversion results is in a different coordinate plane.

Statement 7: the method of any of statements 1-6, wherein the interpolated 3D resistivity data is provided as an input model into a two-dimensional (2D) or 3D inversion model to acquire an optimized final 2D or 3D inverted model.

Statement 8: a system for generating a wellbore resistivity map, the system comprising: one or more processors, and a non-transitory memory coupled to the one or more processors, wherein the memory comprises instruction configured to cause the processors to perform operations for: receiving a plurality of measurement sets, wherein each measurement set comprises electromagnetic field data associated with a geologic formation at a corresponding plurality of predetermined depths, generating a plurality of one-dimensional (1D) inversion results based on the plurality of measurement sets, performing a three-dimensional (3D) interpolation on the plurality of 1D inversion results to generate interpolated 3D resistivity data, and outputting a 3D resistivity map based on the interpolated 3D resistivity data.

Statement 9: the system of statement 8, further comprising: performing one or more geosteering operations based on the 3D resistivity map.

Statement 10: the system of any of statements 8-9, wherein the plurality of predetermined depths are substantially continuous.

Statement 11: the system of any of statements 9-10, wherein generating the plurality of 1D inversion results, further comprises: determining a relative bed azimuth for each of the plurality of 1D inversion results.

Statement 12: the system of any of statements 9-11, wherein generating the plurality of 1D inversion results, further comprises: defining one or more measurements for each of the plurality of 1D inversion results.

Statement 13: the system of any of statements 9-12, wherein each of the plurality of 1D inversion results is in a different coordinate plane.

Statement 14: the system of any of statements 9-13, wherein the interpolated 3D resistivity data is provided as an input model into a two-dimensional (2D) or 3D inversion model to acquire an optimized final 2D or 3D inverted model.

Statement 15: a tangible, non-transitory, computer-readable media having instructions encoded thereon, the instructions, when executed by a processor, are operable to perform operations for: receiving a plurality of measurement sets, wherein each measurement set comprises electromagnetic field data associated with a geologic formation at a corresponding plurality of predetermined depths, generating a plurality of one-dimensional (1D) inversion results based on the plurality of measurement sets, performing a three-dimensional (3D) interpolation on the plurality of 1D inversion results to generate interpolated 3D resistivity data, and outputting a 3D resistivity map based on the interpolated 3D resistivity data.

Statement 16: the tangible, non-transitory, computer-readable media of statement 15, wherein the instructions are further configured to cause the processor to perform operations comprising: performing one or more geosteering operations based on the 3D resistivity map.

Statement 17: the tangible, non-transitory, computer-readable media of any of statements 15-16, wherein the plurality of predetermined depths are substantially continuous.

Statement 18: the tangible, non-transitory, computer-readable media of any of statements 15-17, wherein generating the plurality of 1D inversion results, further comprises: determining a relative bed azimuth for each of the plurality of 1D inversion results.

Statement 19: the tangible, non-transitory, computer-readable media of any of statements 15-18, wherein generating the plurality of 1D inversion results, further comprises: defining one or more measurements for each of the plurality of 1D inversion results.

Statement 20: the tangible, non-transitory, computer-readable media of any of statements 15-19, wherein each of the plurality of 1D inversion results is in a different coordinate plane.

What is claimed is:

1. A computer-implemented method for generating a resistivity map, comprising:
   receiving a plurality of measurement sets, wherein each measurement set comprises electromagnetic field data associated with a geologic formation at a corresponding plurality of predetermined depths;
   generating a plurality of one-dimensional (1D) inversion results based on the plurality of measurement sets;
   performing a three-dimensional (3D) interpolation on the plurality of 1D inversion results to generate interpolated 3D resistivity data by applying an interpolation technique to continuous and adjacent 1D inversion results of the plurality of 1D inversion results based on a corresponding local coordinate system for each 1D inversion result; and
   outputting a 3D resistivity map based on the interpolated 3D resistivity data.

2. The computer-implemented method of claim 1, further comprising:
   performing one or more geosteering operations based on the 3D resistivity map.

3. The computer-implemented method of claim 1, wherein the plurality of predetermined depths are continuous.

4. The computer-implemented method of claim 1, wherein generating the plurality of 1D inversion results, further comprises:
   determining a relative bed azimuth for each of the plurality of 1D inversion results.

5. The computer-implemented method of claim 1, wherein generating the plurality of 1D inversion results, further comprises:
   defining one or more measurements for each of the plurality of 1D inversion results.

6. The computer-implemented method of claim 1, wherein each of the plurality of 1D inversion results is in a different coordinate plane.

7. The computer-implemented method of claim 1, wherein the interpolated 3D resistivity data is provided as an input model into a two-dimensional (2D) or 3D inversion model to acquire an optimized final 2D or 3D inverted model.

8. A system for generating a wellbore resistivity map, the system comprising:
   one or more processors; and
   a non-transitory memory coupled to the one or more processors, wherein the memory comprises instruction configured to cause the processors to perform operations for:
   receiving a plurality of measurement sets, wherein each measurement set comprises electromagnetic field data associated with a geologic formation at a corresponding plurality of predetermined depths;
   generating a plurality of one-dimensional (1D) inversion results based on the plurality of measurement sets;
   performing a three-dimensional (3D) interpolation on the plurality of 1D inversion results to generate interpolated 3D resistivity data by applying an interpolation technique to continuous and adjacent 1D inversion results of the plurality of 1D inversion results based on a corresponding local coordinate system for each 1D inversion result; and
   outputting a 3D resistivity map based on the interpolated 3D resistivity data.

9. The system of claim 8, further comprising:
   performing one or more geosteering operations based on the 3D resistivity map.

10. The system of claim 8, wherein the plurality of predetermined depths are continuous.

11. The system of claim 8, wherein generating the plurality of 1D inversion results, further comprises:
    determining a relative bed azimuth for each of the plurality of 1D inversion results.

12. The system of claim 8, wherein generating the plurality of 1D inversion results, further comprises:
    defining one or more measurements for each of the plurality of 1D inversion results.

13. The system of claim 8, wherein each of the plurality of 1D inversion results is in a different coordinate plane.

14. The system of claim 8, wherein the interpolated 3D resistivity data is provided as an input model into a two-dimensional (2D) or 3D inversion model to acquire an optimized final 2D or 3D inverted model.

15. A tangible, non-transitory, computer-readable media having instructions encoded thereon, the instructions, when executed by a processor, are operable to perform operations for:
    receiving a plurality of measurement sets, wherein each measurement set comprises electromagnetic field data associated with a geologic formation at a corresponding plurality of predetermined depths;
    generating a plurality of one-dimensional (1D) inversion results based on the plurality of measurement sets;
    performing a three-dimensional (3D) interpolation on the plurality of 1D inversion results to generate interpolated 3D resistivity data by applying an interpolation technique to continuous and adjacent 1D inversion results of the plurality of 1D inversion results based on a corresponding local coordinate system for each 1D inversion result; and
    outputting a 3D resistivity map based on the interpolated 3D resistivity data.

16. The tangible, non-transitory, computer-readable media of claim 15, wherein the instructions are further configured to cause the processor to perform operations comprising:
    performing one or more geosteering operations based on the 3D resistivity map.

17. The tangible, non-transitory, computer-readable media of claim 15, wherein the plurality of predetermined depths are continuous.

18. The tangible, non-transitory, computer-readable media of claim 15, wherein generating the plurality of 1D inversion results, further comprises:
    determining a relative bed azimuth for each of the plurality of 1D inversion results.

19. The tangible, non-transitory, computer-readable media of claim 15, wherein generating the plurality of 1D inversion results, further comprises:
    defining one or more measurements for each of the plurality of 1D inversion results.

20. The tangible, non-transitory, computer-readable media of claim 15, wherein each of the plurality of 1D inversion results is in a different coordinate plane.

* * * * *